US006644676B2

(12) United States Patent
Wu

(10) Patent No.: US 6,644,676 B2
(45) Date of Patent: Nov. 11, 2003

(54) SAFETY DEVICE FOR A FRONT WHEEL OF A VEHICLE FOR CHILDREN

(76) Inventor: Jung-Jyh Wu, Floor 7, No. 5, Lane 56, Jong Jeng 2nd Road, Lin Yea District, Kaohsiung (TW)

( * ) Notice: Subject to any disclaimer, the term of this patent is extended or adjusted under 35 U.S.C. 154(b) by 84 days.

(21) Appl. No.: 10/079,481

(22) Filed: Feb. 22, 2002

(65) Prior Publication Data

US 2003/0160419 A1 Aug. 28, 2003

(51) Int. Cl.[7] ................................................ B62M 1/02
(52) U.S. Cl. ...................................... 280/259; 280/282
(58) Field of Search ................................ 280/200, 259, 280/263, 282; 403/150, 151, 165

(56) References Cited

U.S. PATENT DOCUMENTS 5,273,300 A * 12/1993 Wells ......................... 280/259
5,499,834 A * 3/1996 Pasin et al. ................. 280/282

* cited by examiner

Primary Examiner—Lesley D. Morris
Assistant Examiner—L. Lum
(74) Attorney, Agent, or Firm—Rosenberg, Klein & Lee

(57) ABSTRACT

A front wheel for a vehicle for children provides a wheel frame having a slot through which a crank extends. A locking plate is securely mounted to the crank to turn therewith. A switch member is attached to the wheel frame and includes a guide groove. When an end of a pin is in an end of the guide groove of the switch member, the other end of the pin is in a locking position engaged with a positioning notch of the locking plate, thereby allowing joint rotation of the wheel frame and the crank. When the end of the pin is in a second end of the guide groove of the switch member, the other end of the pin is in an unlocking position disengaged from the positioning notch of the locking plate, thereby allowing independent rotations of the crank and the wheel frame.

6 Claims, 5 Drawing Sheets

SAFETY DEVICE FOR A FRONT WHEEL OF A VEHICLE FOR CHILDREN

BACKGROUND OF THE INVENTION

1. Field of the Invention

The present invention relates to a safety device for a front wheel of a vehicle for children. In particular, the present invention relates to a safety device for controlling joint or independent rotations of the front wheel and the pedals of a vehicle for children.

2. Description of the Related Art

FIG. 1 of the drawings illustrates a tricycle 1 for children comprising a front fork 11 to which a front wheel 12 is attached. A pair of pedals 13 is directly attached to the front wheel 12 for driving the latter forward or rearward. However, a child might step on the ground with his/her feet to drive the tricycle if he/she is too small to pedal. Thus, the pedals 13 would turn and thus cause injury to the insteps of the feet or the shanks of the child while the tricycle is moving, as the pedals 13 are directly mounted to the front wheel 12 to turn therewith. The present invention is intended to provide a safety device to solve this problem.

SUMMARY OF THE INVENTION

An object of the present invention is to provide a safety device for controlling joint or independent rotations of the front wheel and the pedals of a vehicle for children.

A front wheel for a vehicle for children, the front wheel comprises:

a wheel frame including a first side and a second side defining a compartment therebetween, the wheel frame further including a slot extending from the first side through the second side, the wheel frame further including a guide slot;

a crank extending through the slot of the wheel frame, a locking plate being securely mounted to the crank to turn therewith, the locking plate being located in the compartment and including at least one positioning notch; and a safety device for controlling independent rotations of the wheel frame and the crank, the safety device including a switch member that is attached to the wheel frame and that is rotatable between a first position and a second position, the switch member further including a guide groove having a first end and a second end, the safety device further including a pin having a first end received in the guide groove of the switch member and a second end extending through the guide slot into the compartment of the wheel frame, the pin being moved between a locking position and an unlocking position corresponding to the first position and the second position of the switch member;

wherein when the first end of the pin is in the first end of the guide groove of the switch member, the second end of the pin is in the locking position that is engaged with said at least one positioning notch of the locking plate, thereby allowing joint rotation of the wheel frame and the crank; and wherein when the first end of the pin is in the second end of the guide groove of the switch member, the second end of the pin is in the unlocking position that is disengaged from said at least one positioning notch of the locking plate, thereby allowing independent rotations of the crank and the wheel frame.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
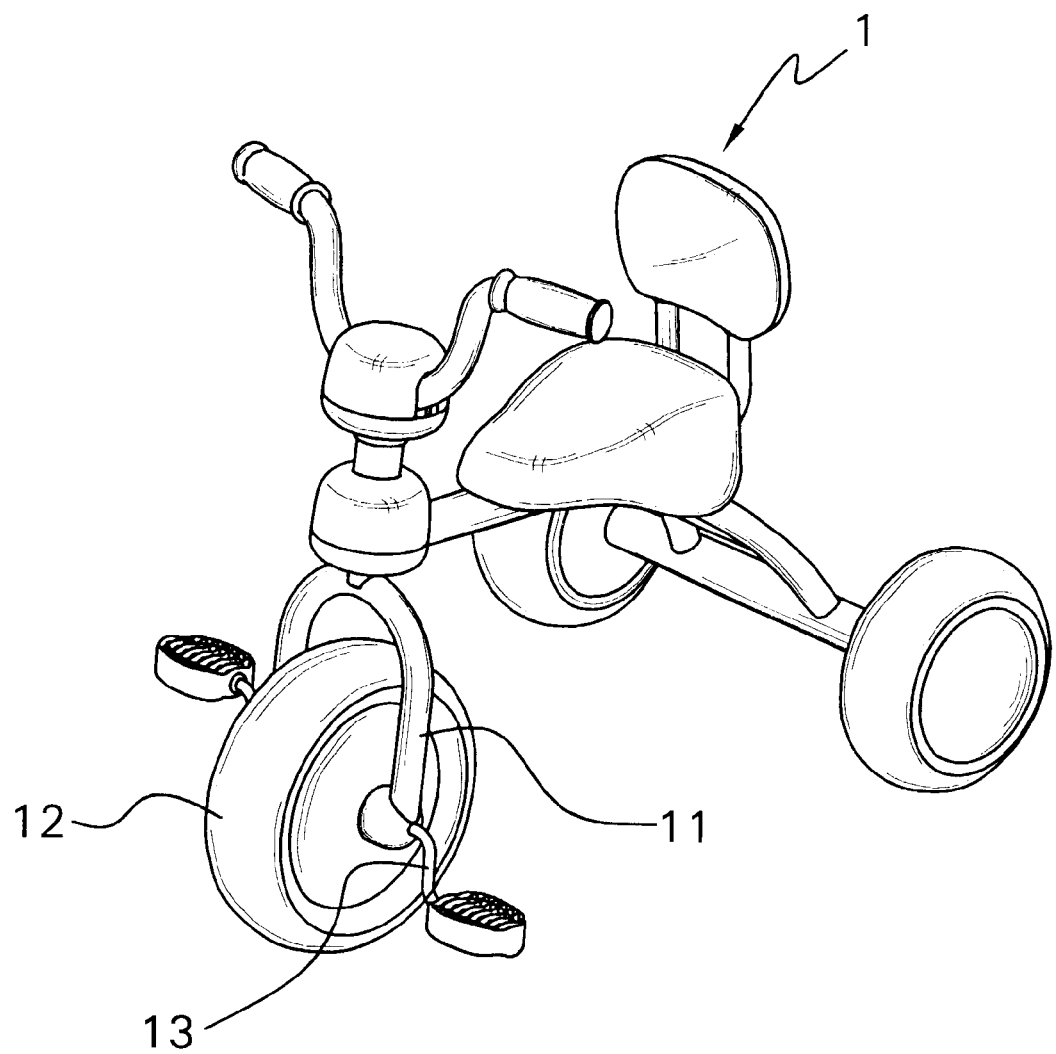
FIG. 1 is a perspective view of a conventional tricycle in accordance with the present invention.
Figure 2:
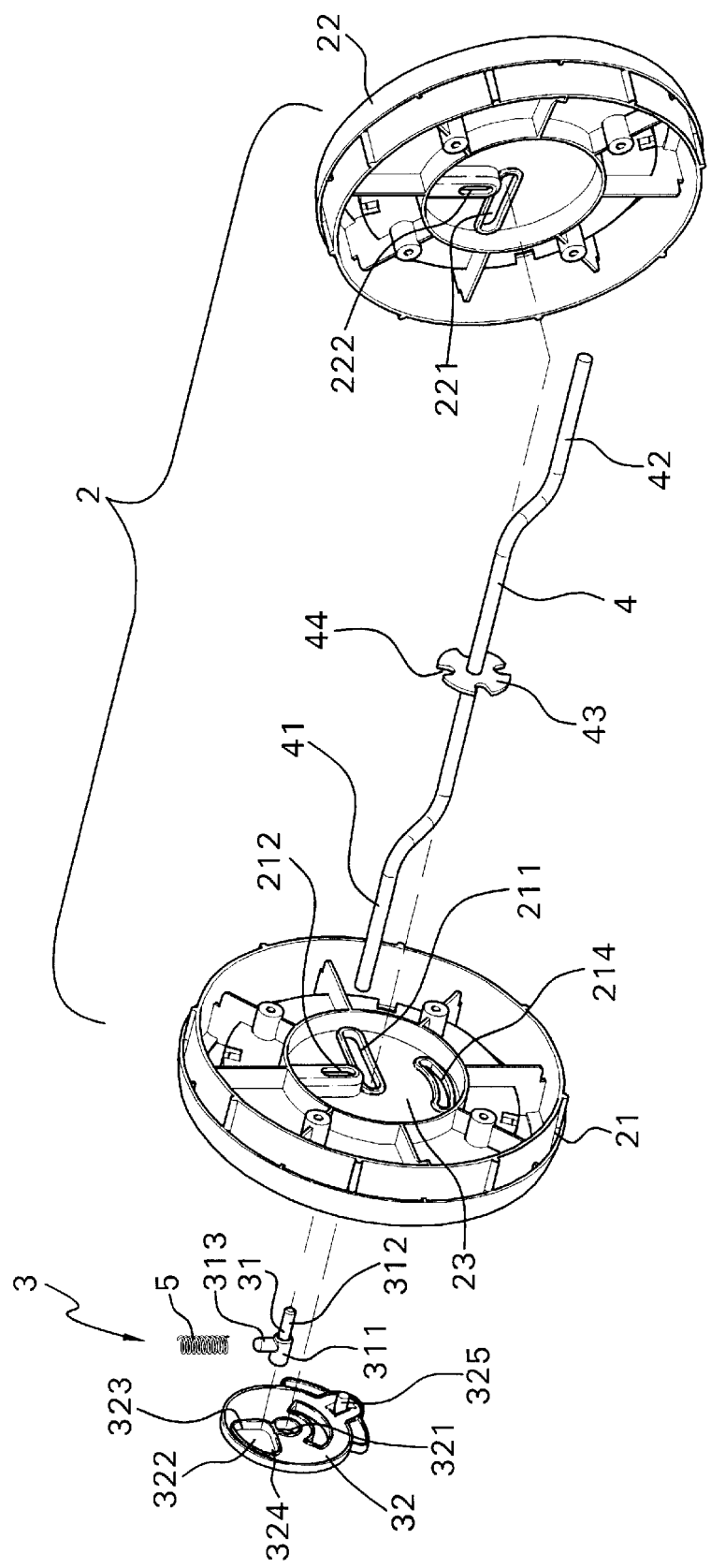
FIG. 2 is an exploded perspective view of a front wheel of a vehicle for children having a safety device in accordance with the present invention.
Figure 3:
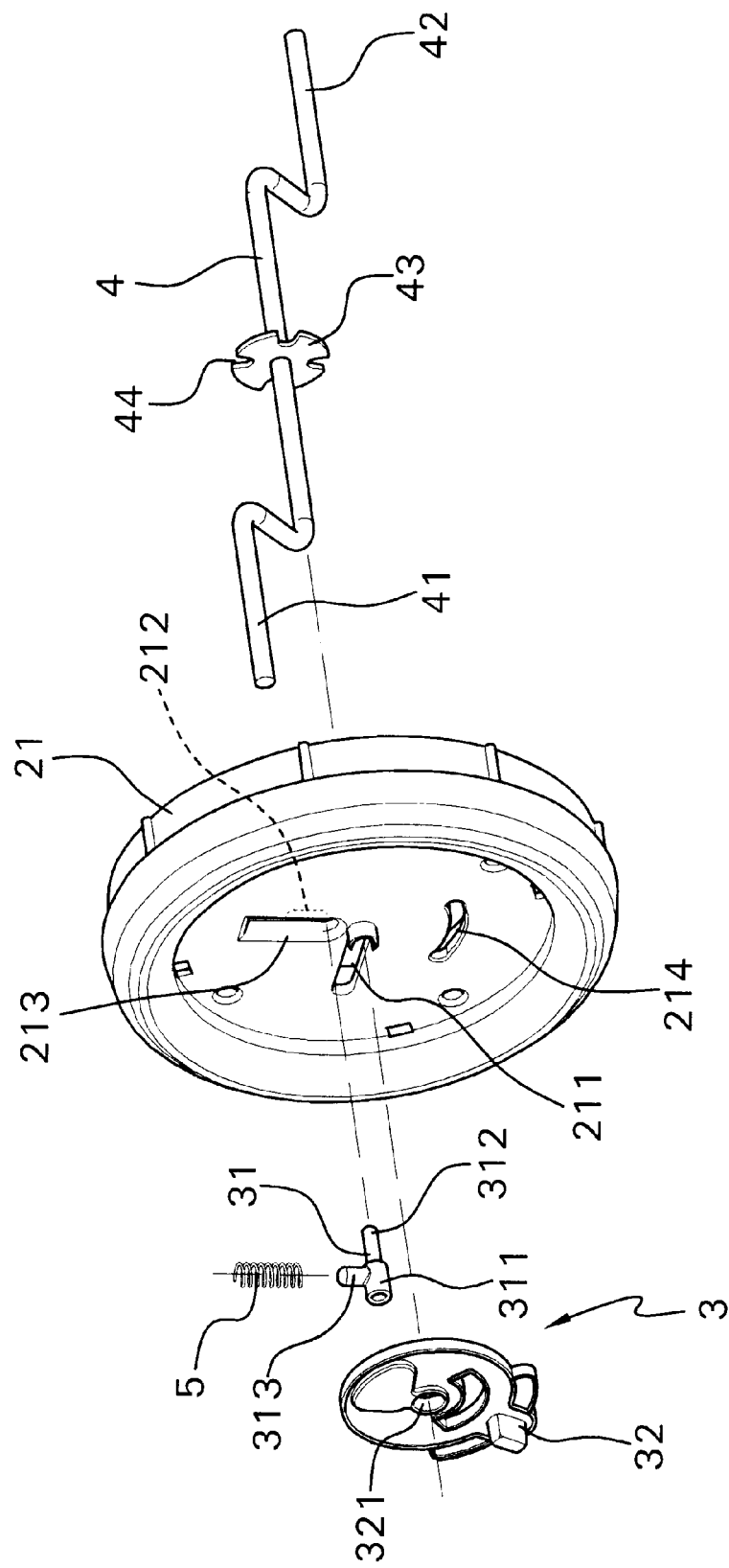
FIG. 3 is a perspective view, partly exploded, of the front wheel in accordance with the present invention.

Referring to FIGS. 2 and 3, a front wheel in accordance with the present invention generally includes a wheel frame 2, a crank 4, and a safety device 3. A rubber tire (not shown) is mounted around the wheel frame 2. In this embodiment, the wheel frame 2 is comprised of a left cover 21 and a right cover 22 that together define a compartment 23. The left cover 21 and the right cover 22 include aligned holes or slots 211 and 221 allowing the crank 4 to extend therethrough. An inner side of at least one of the covers 21 and 22 further includes a guide slot 212, 222 extending in a radial direction. Further, a receiving groove 213 is defined in an outer side of at least one of the covers 21 and 22 and has a portion communicates with the respective guide slot 212, 222. Further, the left cover 21 includes an arcuate guide slot 214 extending in a circumferential direction. Namely, the arcuate guide slot 214 extends along a circle having a center coincident to that of the left cover 21. Preferably, the arcuate guide slot 214 includes two reduced ends.

The safety device 3 comprises a pin 31 and a switch member 32. The pin 31 is extended through the guide slots 212 and 222 of the covers 21 and 22. Further, the pin 31 is movable toward or away from a center of the wheel frame 2. The switch member 32 is preferably a disc having a hole 321 through which the crank 4 extends. The switch member 32 further includes a guide groove 322 for receiving an end 311 of the pin 31. The guide groove 322 includes a relatively larger end 323 adjacent to the hole 321 and a relatively smaller end 324 distal to the hole 321. The end 311 of the pin 31 is movable between the relatively larger end 323 and the relatively smaller end 324 of the guide groove 322. Further, the switch member 32 includes a peg 325 (FIG. 2) projecting from an inner side thereof, the peg 325 extending into the arcuate guide slot 214 of the left cover 214.

The crank 4 includes two crooked end sections 41 and 42 to which two pedals (not shown) are respectively mounted. A locking plate 43 is securely mounted to a middle section of the crank 4 to turn therewith. The locking plate 43 includes at least one positioning notch 44 for releasably engaging with the other end 312 of the pin 31.

In assembly, the covers 21 and 22 are mounted to the crank 4; namely, the crank 4 is extended through the slots 211 and 221 of the covers 21 and 22 with the locking plate 43 being located in the compartment 23 defined by the covers 21 and 22. The other end 312 of the pin 31 is extended through the guide slots 212 and 222 with a protrusion 313 on the pin 31 being located in the receiving groove 213. An elastic element 5 is mounted in the receiving groove 213 and attached between the protrusion 313 of the pin 31 and an end wall defining the receiving groove 213, thereby biasing the pin 31 toward the center of the left cover 21. Next, the switch member 32 is attached to the left cover 21. The hole 321 of the switch member 32 is extended through by the crank 4. The end 311 of the pin 31 is located in the guide groove 322 of the switch member 32. The peg 325 of the switch member 32 is located in the arcuate guide slot 214.

Figure 4:
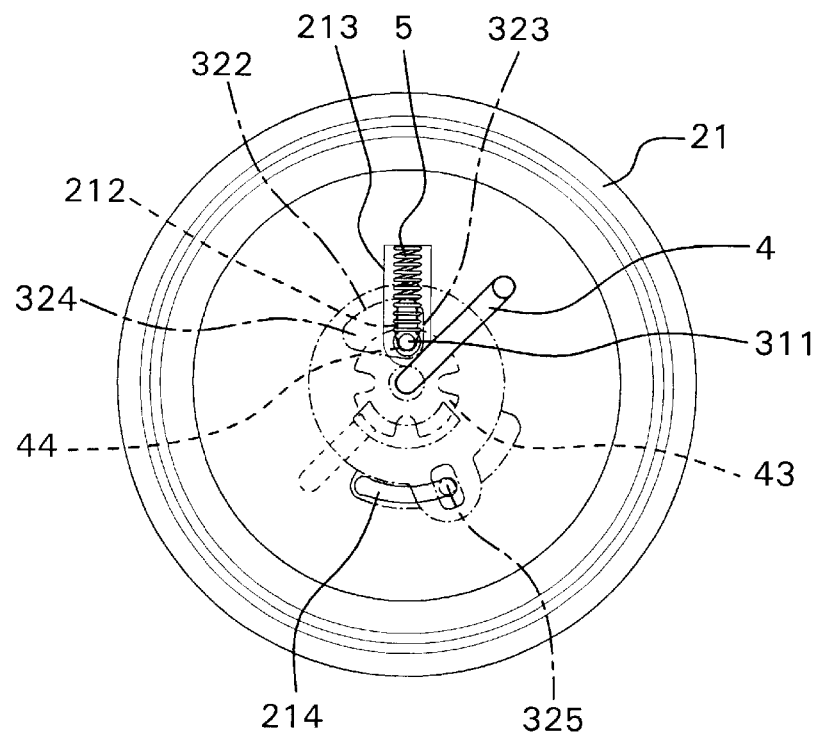
FIG. 4 is a side view of the front wheel in accordance with the present invention.
Figure 5:
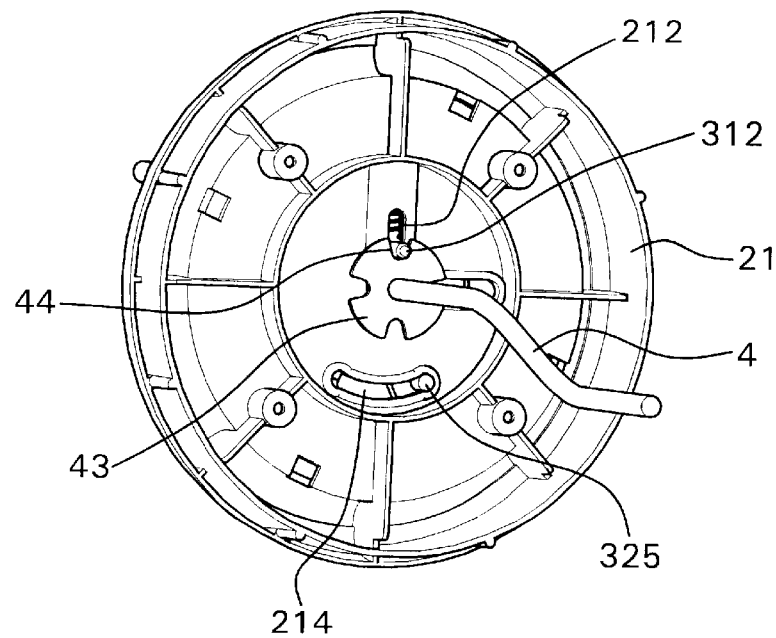
FIG. 5 is a side view illustrating inner structure of the front wheel in accordance with the present invention.

Referring to FIGS. 4 and 5, when the end 311 of the pin 31 is located in the relatively larger end 323 of the guide groove 322 of the switch member 32, the pin 31 is biased by the elastic element 5 toward the center of the wheel frame 2 (i.e., the locking plate 43). Thus, the pin 31 is engaged in one of the positioning notches 44 of the locking plate 43. The wheel frame 2 turns together with the crank 4 when either one of the wheel frame 2 and the pedals (not shown) is turned.

Figure 6:
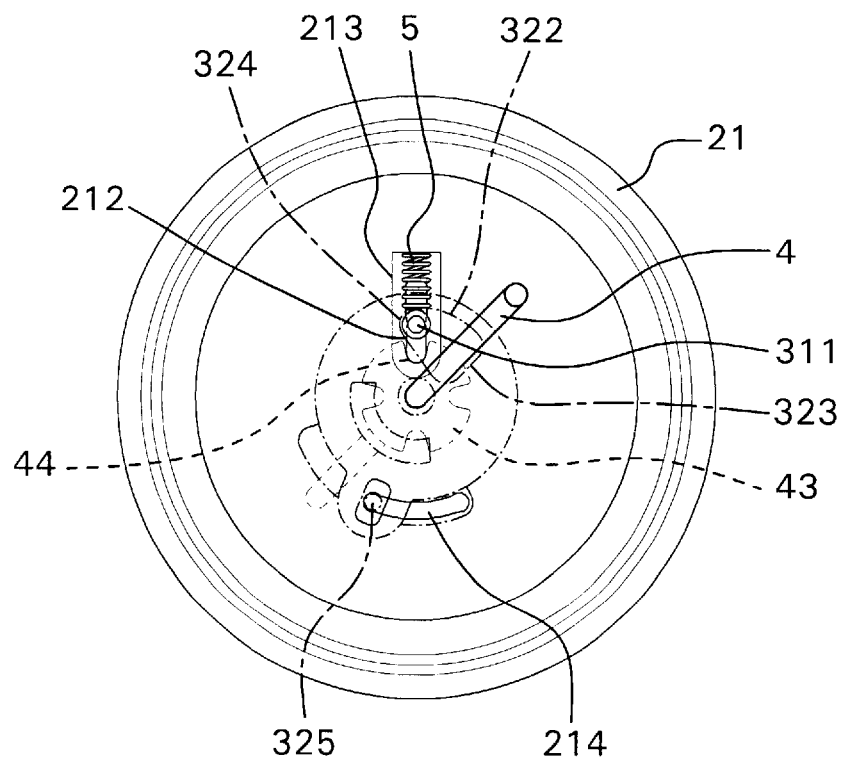
FIG. 6 is a view similar to FIG. 4, wherein the safety device is in a position allowing independent rotations of the front wheel and the pedals.
Figure 7:
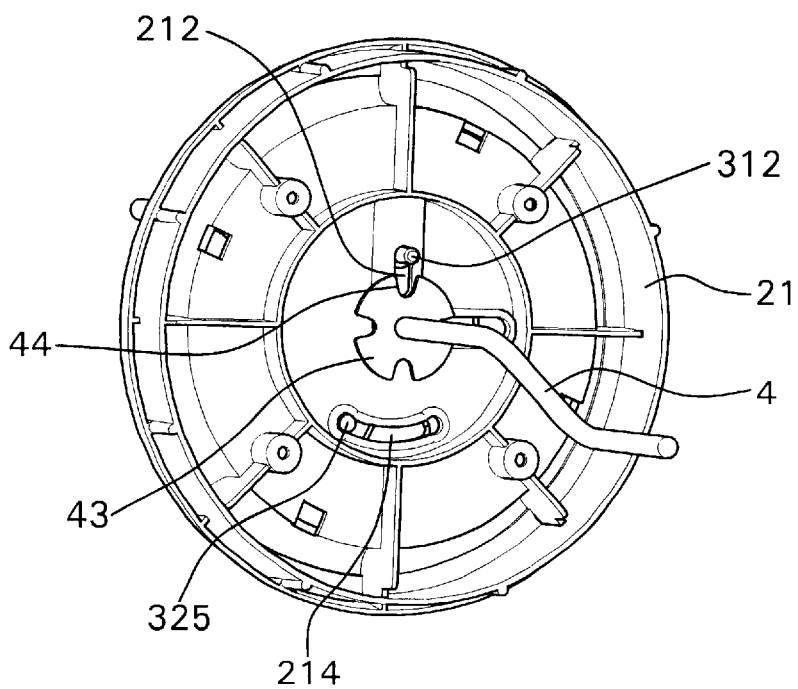
FIG. 7 is a view similar to FIG. 5, wherein the safety device is in a position allowing independent rotations of the front wheel and the pedals.

Referring to FIGS. 6 and 7, in a case that the parent intends to push the vehicle for children or the child likes to step on the ground for moving the vehicle, the switch member 32 is turned through an angle until the end 311 of the pin 31 is engaged in the relatively smaller end 324 of the guide groove 322 of the switch member 32 that is distal to the center of the wheel frame 2. Namely, the guide groove 322 of the switch member 32 is so configured that when the switch member 32 is in a first position, the pin 31 is moved to a position adjacent to the locking plate 43 and thus engaged with one of the positioning notches 44 to allow joint rotation of the wheel frame 2 and the crank 4 and that when the switch member 32 is turned to a second position, the pin 31 is moved to another position distal to the locking plate 43 and thus disengaged from the positioning notch 44 of the locking plate 43 to allow independent rotations of the wheel frame 2 and the crank 4. Thus, the crank 4 would not turn when the wheel frame 2 turns. Injury to the child riding the vehicle is prevented. The peg 325 slides along the arcuate guide slot 214 of the left cover 21, thereby allowing reliably rotation of the switch member 32. The ends of the arcuate guide slot 214 may be reduced to position the peg 325 in place.

Although the invention has been explained in relation to its preferred embodiment, it is to be understood that many other possible modifications and variations can be made without departing from the scope of the invention as hereinafter claimed.

What is claimed is:

1. A front wheel for a vehicle for children, the front wheel comprising:

a wheel frame (2) including a first side and a second side defining a compartment (23) therebetween, the wheel frame further including a slot (211, 221) extending from the first side through the second side, the wheel frame further including a guide slot (212);

a crank (4) extending through the slot (211, 221) of the wheel frame (2), a locking plate (43) being securely mounted to the crank (4) to turn therewith, the locking plate (43) being located in the compartment (23) and including at least one positioning notch (44); and a safety device (3) for controlling independent rotations of the wheel frame (2) and the crank (4), the safety device (3) including a switch member (32) that is attached to the wheel frame (2) and that is rotatable between a first position and a second position, the switch member (32) further including a guide groove (322) having a first end (323) and a second end (324), the safety device (3) further including a pin (31) having a first end (311) received in the guide groove (322) of the switch member (32) and a second end (312) extending through the guide slot (212) into the compartment (23) of the wheel frame (2), the pin (31) being moved between a locking position and an unlocking position corresponding to the first position and the second position of the switch member (32);

wherein when the first end (311) of the pin (31) is in the first end (323) of the guide groove (322) of the switch member (32), the second end (312) of the pin (31) is in the locking position that is engaged with said at least one positioning notch (44) of the locking plate (43), thereby allowing joint rotation of the wheel frame (2) and the crank (4); and wherein when the first end (311) of the pin (31) is in the second end (324) of the guide groove (322) of the switch member (32), the second end (312) of the pin (31) is in the unlocking position that is disengaged from said at least one positioning notch (44) of the locking plate (43), thereby allowing independent rotations of the crank (4) and the wheel frame (2).

2. The front wheel as claimed in claim 1, wherein the wheel frame (2) includes a receiving groove (213) having a portion communicated with the guide slot (212), further comprising an elastic element (5) mounted in the receiving groove (213) for biasing the pin (31) toward the locking plate (43).

3. The front wheel as claimed in claim 1, wherein the switch member (32) includes a hole (321) through which the crank (4) extends, the first end (323) of the guide groove (322) of the switch member (32) being larger than the second end (324) of the guide groove (322) of the switch member (32), the first end (323) of the guide groove (322) of the switch member (32) being more adjacent to the hole (321) of the switch member (32) than the second end (324) of the guide groove (322) of the switch member (32).

4. The front wheel as claimed in claim 1, wherein the wheel frame (2) includes an arcuate guide slot (214), and wherein the switch member (32) includes a peg (325) slidably received in the arcuate guide slot (214).

5. The front wheel as claimed in claim 4, wherein the arcuate guide slot (214) of the switch member (32) includes two reduced ends for positioning the peg (325).

6. The front wheel as claimed in claim 1, wherein the wheel frame (2) is comprised of a left cover (21) and a right cover (22).

* * * * *